(12) United States Patent
Jurjens

(10) Patent No.: US 10,933,479 B2
(45) Date of Patent: Mar. 2, 2021

(54) BAND SAW VICE ASSEMBLY

(71) Applicant: James Jurjens, Dorchester (CA)

(72) Inventor: James Jurjens, Dorchester (CA)

( * ) Notice: Subject to any disclaimer, the term of this patent is extended or adjusted under 35 U.S.C. 154(b) by 445 days.

(21) Appl. No.: 15/894,318

(22) Filed: Feb. 12, 2018

(65) Prior Publication Data

US 2019/0247939 A1    Aug. 15, 2019

(51) Int. Cl.
*B23D 55/04* (2006.01)
*B25B 1/10* (2006.01)
*B25B 1/24* (2006.01)
*B23D 55/08* (2006.01)

(52) U.S. Cl.
CPC ........... *B23D 55/04* (2013.01); *B23D 55/082* (2013.01); *B25B 1/103* (2013.01); *B25B 1/2405* (2013.01)

(58) Field of Classification Search
CPC ...... B23D 55/04; B23D 29/00; B23D 55/082; B25B 1/02; B25B 1/06; B25B 1/103; B25B 1/125; B25B 1/18; B25B 1/205; B25B 1/2405; B25B 1/2489; B25B 5/085; B25B 15/125; B25B 5/127; B25B 11/02; B25B 11/00; Y10T 29/49998
USPC ..................................... 83/820, 743; 269/257
See application file for complete search history.

(56) References Cited

U.S. PATENT DOCUMENTS

| | | | |
|---|---|---|---|
| 3,530,752 A * | 9/1970 | Aizawa | B23D 55/082 83/820 |
| 3,850,422 A * | 11/1974 | Kwas | B25B 1/06 269/196 |
| 4,219,918 A * | 9/1980 | Klann | B25B 27/304 254/10.5 |
| 4,340,211 A | 7/1982 | Chiappetti | |
| 4,796,877 A | 1/1989 | Musil et al. | |
| 5,338,016 A * | 8/1994 | Howard | B25B 1/103 269/208 |
| 5,518,220 A * | 5/1996 | Bertrand | B66F 7/025 254/7 B |
| 5,692,426 A | 12/1997 | Alexander | |
| 5,806,187 A | 9/1998 | Ducret | |
| 5,954,314 A * | 9/1999 | Weisshaar | B25B 27/304 254/10.5 |
| 6,065,744 A | 5/2000 | Lawrence | |
| 6,205,897 B1 | 3/2001 | Carter | |
| 7,111,720 B1 * | 9/2006 | Harris | B23D 55/04 198/345.1 |
| 7,159,496 B2 * | 1/2007 | Maes | B23D 45/12 269/41 |

(Continued)

*Primary Examiner* — Tyrone V Hall, Jr.
*Assistant Examiner* — Mahdi H Nejad

(57) ABSTRACT

A band saw vice assembly for securing a substrate for cutting includes a base that has a first plate coupled to and extending vertically from a first side. A first bar, which is hollow, is coupled to and extends perpendicularly from the first plate. A second plate is coupled to and extends perpendicularly from a sleeve that is positioned around the first bar. A first slot and a second slot, which are aligned and perpendicular to the base, are positioned in the first plate and the second plate, respectively. An actuator, which is operationally coupled to the sleeve, is coupled to and positioned in the first bar. The actuator is positioned to motivate the second plate toward the first plate to frictionally couple to a substrate to fixedly position the substrate. The first and second slots are configured to insert a blade of a band saw to cut the substrate.

16 Claims, 4 Drawing Sheets

(56) References Cited

U.S. PATENT DOCUMENTS

| | | | | |
|---|---|---|---|---|
| 8,322,699 B2* | 12/2012 | Prell | .................... | B25B 1/103 |
| | | | | 269/246 |
| 2008/0052921 A1* | 3/2008 | Delfini | ................ | B23D 51/025 |
| | | | | 30/375 |
| 2009/0196721 A1* | 8/2009 | Thiel | ..................... | B66F 7/14 |
| | | | | 414/427 |
| 2010/0072240 A1* | 3/2010 | Cornes | .................... | B60R 9/06 |
| | | | | 224/536 |
| 2010/0283193 A1* | 11/2010 | Huang | ................ | B25B 27/304 |
| | | | | 267/140.2 |
| 2014/0097568 A1* | 4/2014 | Matsumoto | .............. | B66F 7/02 |
| | | | | 269/58 |
| 2014/0246824 A1* | 9/2014 | Fiegener | .............. | B25B 1/2405 |
| | | | | 269/265 |
| 2014/0252711 A1* | 9/2014 | Tropea | ................... | B25B 5/02 |
| | | | | 269/90 |
| 2016/0158857 A1* | 6/2016 | Sakai | ................. | B23D 55/082 |
| | | | | 83/813 |
| 2017/0087651 A1* | 3/2017 | Kitai | .................. | B23D 55/082 |
| 2017/0120406 A1* | 5/2017 | Jourdan | ............. | B23Q 17/003 |
| 2017/0129027 A1* | 5/2017 | Di Giovanni | ........ | B23D 55/046 |

\* cited by examiner

BAND SAW VICE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to vice assemblies and more particularly pertains to a new vice assembly for securing a substrate for cutting.

BRIEF SUMMARY OF THE INVENTION

An embodiment of the disclosure meets the needs presented above by generally comprising a base that has a first plate coupled to and extending vertically from a first side. A first bar, which is hollow, is coupled to and extends perpendicularly from the first plate. A second plate is coupled to and extends perpendicularly from a sleeve that is positioned around the first bar. A first slot and a second slot, which are aligned and perpendicular to the base, are positioned in the first plate and the second plate, respectively. An actuator, which is operationally coupled to the sleeve, is coupled to and positioned in the first bar. The actuator is positioned to motivate the second plate toward the first plate to frictionally couple to a substrate to fixedly position the substrate. The first and second slots are configured to insert a blade of a band saw to cut the substrate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
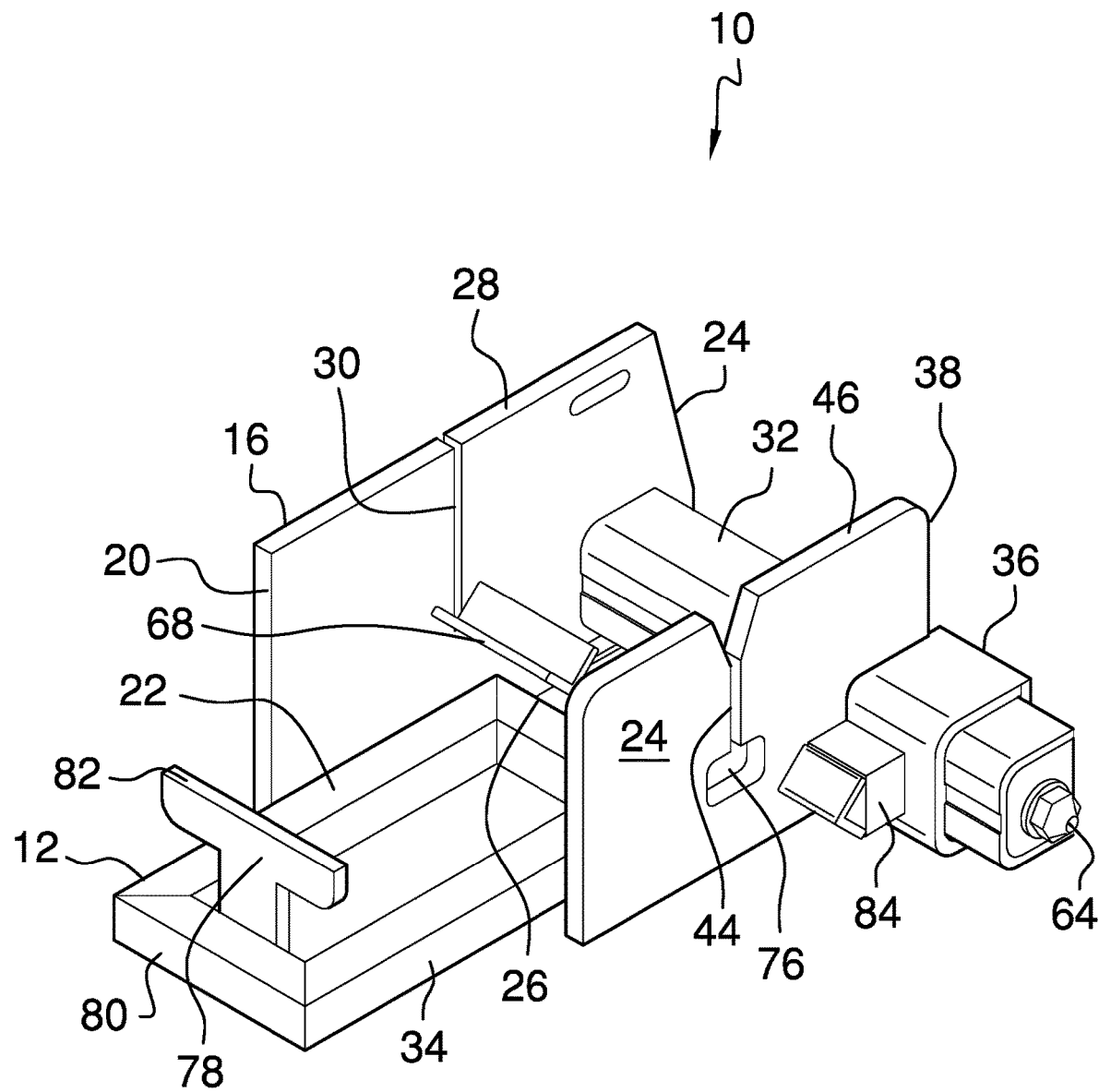
FIG. 1 is an isometric perspective view of a band saw vice assembly according to an embodiment of the disclosure.
Figure 2:
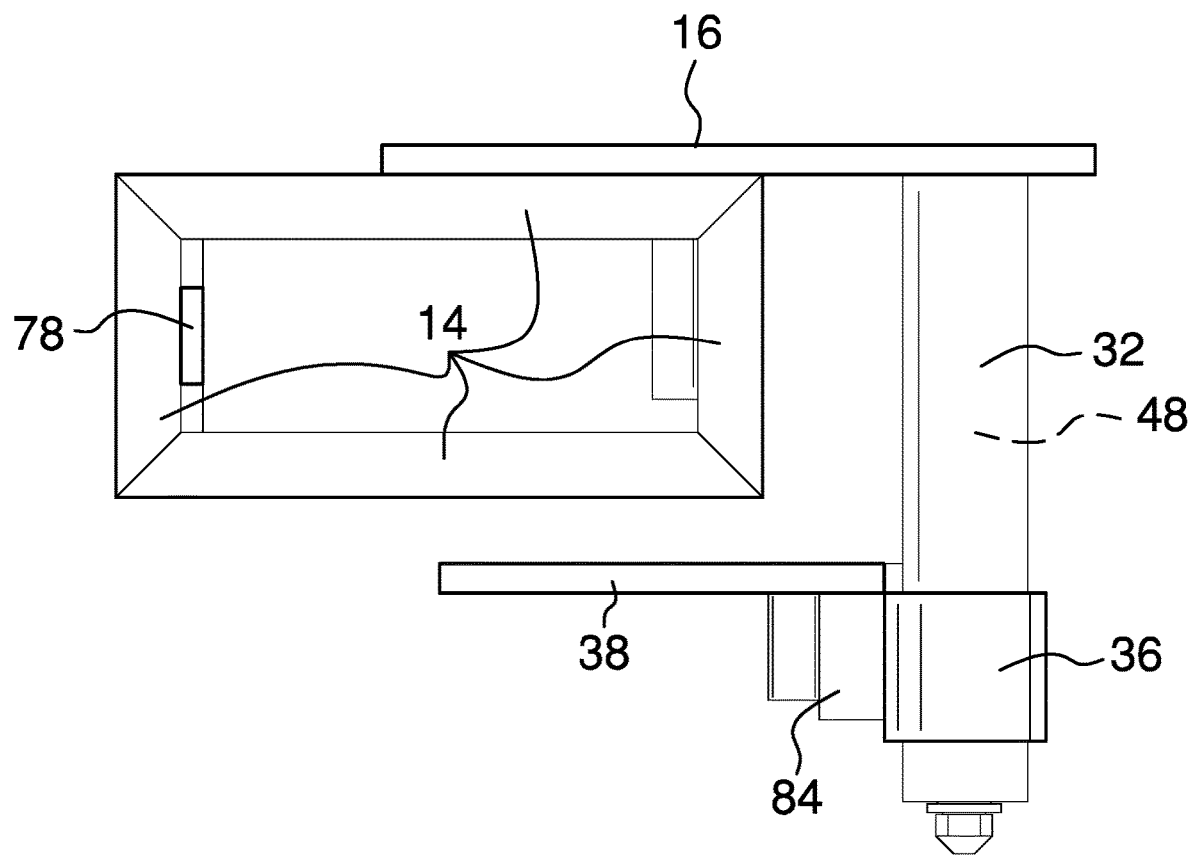
FIG. 2 is a bottom view of an embodiment of the disclosure.

With reference now to the drawings, and in particular to FIGS. 1 through 5 thereof, a new vice assembly embodying the principles and concepts of an embodiment of the disclosure and generally designated by the reference numeral 10 will be described.

As best illustrated in FIGS. 1 through 5, the band saw vice assembly 10 generally comprises a base 12. The base 12 comprises a frame 14 that is tubular and rectangularly shaped, as shown in FIG. 1. A first plate 16 is coupled to and extends vertically from a first side 18 of the base 12. The first plate 16 has a first edge 20 that is positioned proximate to a midpoint 22 of the first side 18. The first plate 16 has a second edge 24 that is positioned distal from a first end 26 of the base 12. The second edge 24 is tapered proximate to an upper edge 28 of the first plate 16.

A first slot 30 is positioned in the first plate 16 and extends from the upper edge 28 of the first plate 16. The first slot 30 is perpendicular to the base 12. The first slot 30 is substantially aligned with the first end 26 of the base 12.

A first bar 32 is coupled to and extends perpendicularly from the first plate 16 past a second side 34 of the base 12. The first bar 32 is hollow. The first bar 32 is substantially rectangularly shaped when viewed longitudinally. A sleeve 36 is positioned around the first bar 32.

A second plate 38 is coupled to and extends perpendicularly from the sleeve 36 toward the first end 26 of the base 12 so that the second plate 38 is parallel to the first plate 16. The sleeve 36 is positioned on an exterior face 40 of the second plate 38. The second plate 38 has upper corners 42 that are arcuate so as to be blunted.

A second slot 44 is positioned in the second plate 38 and extends from a top 46 of the second plate 38. The second slot 44 is aligned with the first slot 30. The second slot 44 is V-shaped proximate to the top 46 of the second plate 38 so that the second slot 44 can tolerate lateral movement of a blade of a band saw as the blade is inserted into the first slot 30 and the second slot 44.

An actuator 48 is coupled to and is positioned in the first bar 32. The actuator 48 is operationally coupled to the sleeve 36. The actuator 48 is configured to selectively motivate the second plate 38 toward the first plate 16 to frictionally couple to a substrate that is positioned between the first plate 16 and the second plate. The substrate, such as a pipe, tube, or conduit, is fixedly positioned between the first plate 16 and the second plate 38. The present invention allows substrates that have a variety of diameters to be fixedly positioned without use of adaptors. The first slot 30 and the second slot 44 are configured to insert the blade of the band saw to cut the substrate.

When a vertical band saw is used, the first plate 16 is positioned on a table of the vertical band saw and the assembly 10 is motivated toward the blade of the vertical band saw so that the blade enters the first slot 30 and the second slot 44. When a horizontal band saw is used to cut the substrate, the assembly 10 is secured in the vice of the horizontal band saw with the blade of the horizontal band saw centered over the first slot 30 and the second slot 44.

The actuator 48 comprises a third slot 50 that is positioned in the first bar 32. The third slot 50 extends from proximate to a first terminus 52 to proximate to a second terminus 54 of the first bar 32. A third plate 56 is coupled to the sleeve 36 and extends through the third slot 50 into the first bar 32. A first hole 58 is positioned in the third plate 56. The first hole 58 is threaded. A second hole 60 is positioned in the second terminus 54 of the first bar 32. A rod 62 is positioned through the second hole 60 and is rotationally coupled to the second terminus 54 of the first bar 32. The rod 62 is threaded. The rod 62 is threadedly inserted through the first hole 58 so that the rod 62 is threadedly coupled to the third plate 56.

A coupler 64 is coupled to the rod 62 and is positioned externally to the first bar 32. The coupler 64 is configured to couple to a tool, such as a wrench, a rotary tool, or the like, to provide mechanical advantage to rotate the rod 62 within the first hole 58. A user is positioned to selectively rotate the rod 62 to motivate the second plate 38 toward the first plate 16. The substrate that is positioned between the first plate 16 and the second plate 38 is frictionally coupled to the first plate 16 and the second plate 38. The substrate is fixedly positioned between the first plate 16 and the second plate 38. The first slot 30 and the second slot 44 are configured to insert the blade of the band saw to cut the substrate. The coupler 64 comprises a nut 66, a square drive socket, or the like.

Figure 3:
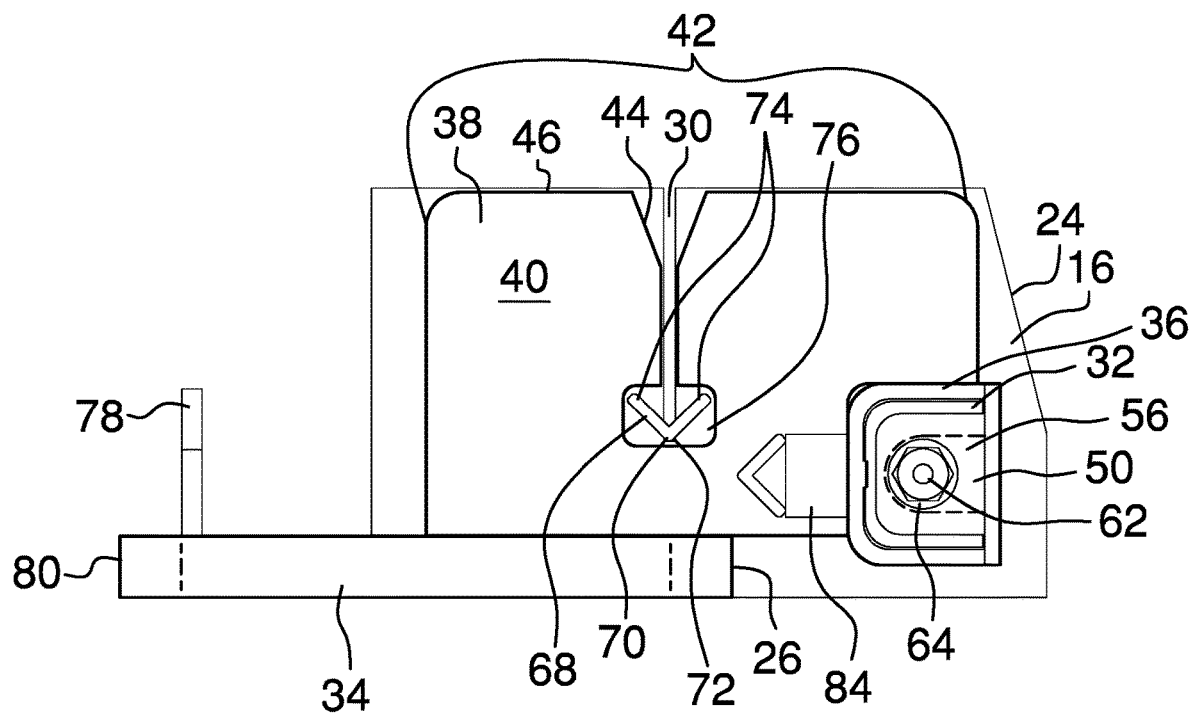
FIG. 3 is a side view of an embodiment of the disclosure.
Figure 4:
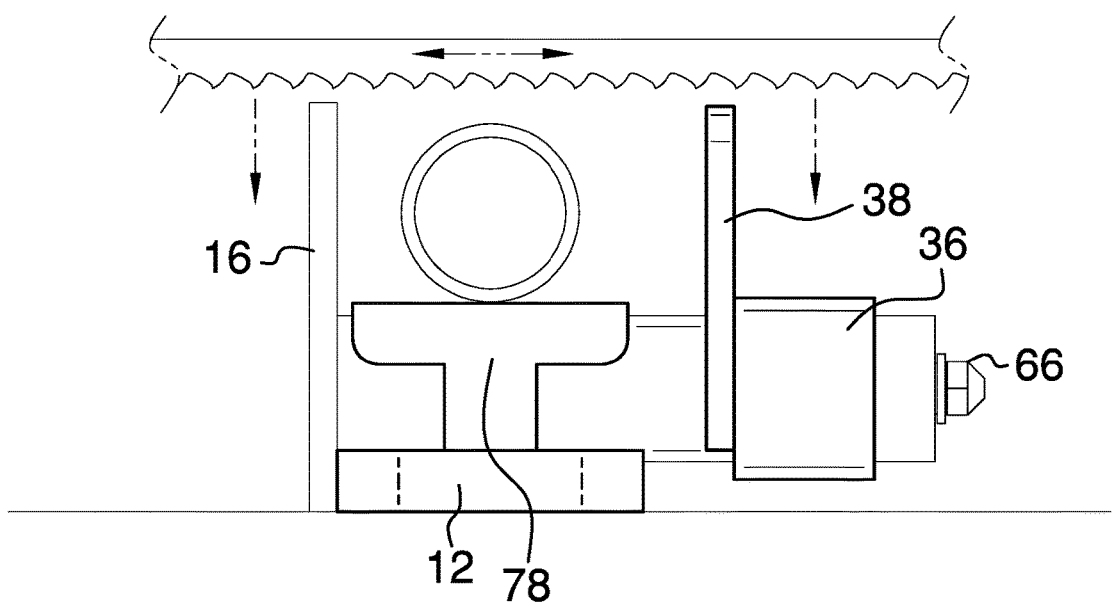
FIG. 4 is an end view of an embodiment of the disclosure.
Figure 5:
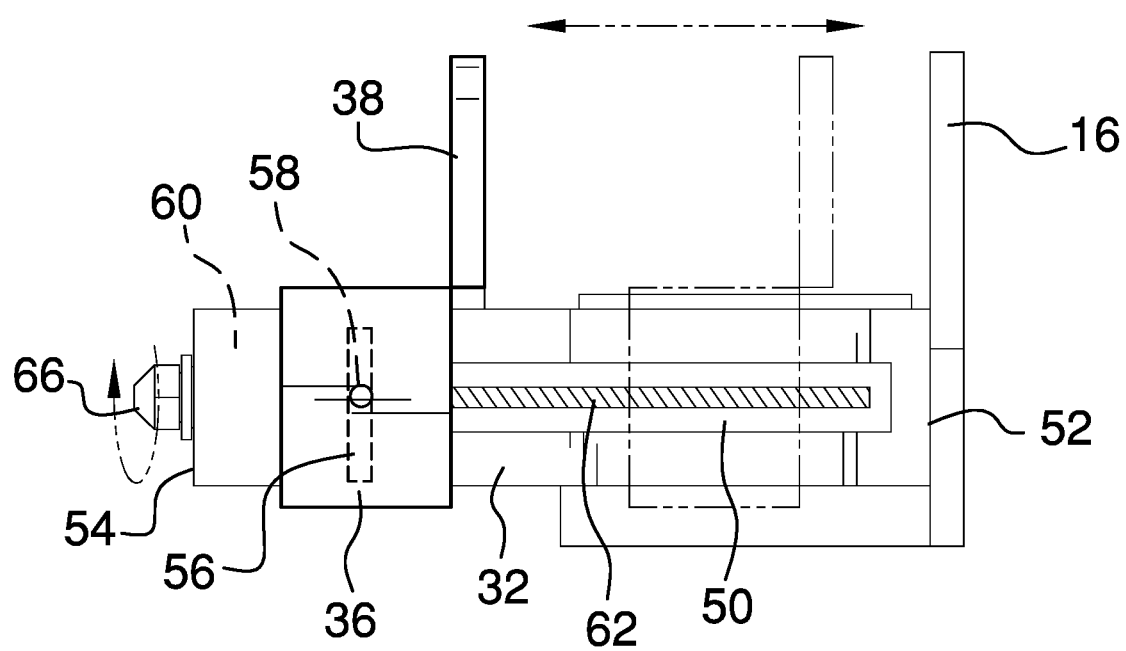
FIG. 5 is a side view of an embodiment of the disclosure.

A second bar 68 is coupled to and extends perpendicularly from the first plate 16. The second bar 68 is V-shaped when viewed longitudinally. The second bar 68 has a lower limit 70, that being the bottom of the V-shape, that is positioned at a terminus 72 of the first slot 30, as shown in FIG. 3. The second bar 68 is configured to square the substrate to the blade. The blade can pass through an upper limit 74 of the second bar 68, that being the open end of the V-shape, to sever the substrate, which is positioned on the upper limit 74 of the second bar 68.

An orifice 76 is positioned in the second plate 38 and extends from the second slot 44. The orifice 76 is positioned to selectively insert the second bar 68 as the second plate 38 is motivated toward the first plate 16. The orifice 76 is positioned in the second plate 38 to allow the second bar 68 to pass through the second plate 38 as the second plate 38 is motivated toward the first plate 16.

A third bar 78 is coupled to and extends vertically from a second end 80 of the base 12. The third bar 78 is T-shaped. The third bar 78 is configured to support the substrate that is positioned between the first plate 16 and the second plate 38. The third bar 78 that has an upper surface 82 that is coplanar with the upper limit 74 of the second bar 68. The second bar 68 and the third bar 78 are configured to support a linear substrate perpendicular to the blade.

A block 84 is coupled to the sleeve 36 and the second plate 38. The block 84 is positioned to stabilize the second plate 38 in parallel with the first plate 16.

In use, the coupler 64 is configured to couple to the tool to position the user to selectively rotate the rod 62 to motivate the second plate 38 toward the first plate 16. The substrate that is positioned between the first plate 16 and the second plate 38 is frictionally coupled to the first plate 16 and the second plate 38. The substrate is fixedly positioned between the first plate 16 and the second plate 38. The second bar 68 is configured to square the substrate to the blade. The first slot 30 and the second slot 44 are configured to insert the blade of the band saw to cut the substrate. The blade can pass through the upper limit 74 of the second bar 68 to sever the substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A band saw vice assembly comprising:
a base;
a first plate coupled to and extending vertically from a first side of said base;
a first slot positioned in said first plate and extending from an upper edge of said first plate, said first slot being perpendicular to said base, said first slot being substantially aligned with a first end of said base;
a first bar coupled to and extending perpendicularly from said first plate, said first bar being hollow;
a sleeve positioned around said first bar;
a second plate coupled to and extending perpendicularly from said sleeve toward said first end of said base such that said second plate is parallel to said first plate;
a second slot positioned in said second plate and extending from a top of said second plate such that said second slot is aligned with said first slot;
an actuator coupled to and positioned in said first bar, said actuator being operationally coupled to said sleeve, said actuator being configured for selectively motivating said second plate toward said first plate; and
wherein said actuator is positioned in said first bar such that said actuator is positioned for motivating said second plate toward said first plate for frictionally coupling to a substrate positioned between said first plate and said second plate for fixedly positioning the substrate such that said first slot and said second slot are configured for inserting a blade of a band saw for cutting the substrate.

2. The assembly of claim 1, further including said first bar extending past a second side of said base.

3. The assembly of claim 1, further including said base comprising a frame, said frame being tubular and rectangularly shaped.

4. The assembly of claim 1, further including said first plate having a first edge positioned proximate to a midpoint of said first side, said first plate having a second edge distal from said first end of said base.

5. The assembly of claim 4, further including said second edge being tapered proximate to said upper edge of said first plate.

6. The assembly of claim 1, further including said first bar being substantially rectangularly shaped when viewed longitudinally.

7. The assembly of claim 1, further including said sleeve being positioned on an exterior face of said second plate.

8. The assembly of claim 1, further including said second plate having upper corners, said upper corners being arcuate.

9. The assembly of claim 1, further including said second slot being V-shaped proximate to said top of said second plate.

10. The assembly of claim 1, further including said actuator comprising:
   a third slot positioned in said first bar, said third slot extending from proximate to a first terminus to proximate to a second terminus of said first bar;
   a third plate coupled to said sleeve and extending through said third slot into said first bar;
   a first hole positioned in said third plate, said first hole being threaded;
   a second hole positioned in said second terminus of said first bar;
   a rod positioned through said second hole and rotationally coupled to said second terminus of said first bar, said rod being threaded, said rod being threadedly inserted through said first hole such that said rod is threadedly coupled to said third plate;
   a coupler coupled to said rod and positioned externally to said first bar, said coupler being configured for coupling to a tool for providing mechanical advantage in rotating said rod within said first hole; and
   wherein said coupler is positioned on said rod such that said coupler is configured for coupling to the tool positioning a user for selectively rotating said rod for motivating said second plate toward said first plate for frictionally coupling to the substrate positioned between said first plate and said second plate for fixedly positioning the substrate such that said first slot and said second slot are configured for inserting the blade of the band saw for cutting the substrate.

11. The assembly of claim 10, further including said coupler comprising a nut.

12. The assembly of claim 1, further including a block coupled to said sleeve and said second plate, wherein said block is positioned on said sleeve and said second plate such that said block is positioned for stabilizing said second plate in parallel with said first plate.

13. A band saw vice assembly comprising:
   a base;
   a first plate coupled to and extending vertically from a first side of said base;
   a first slot positioned in said first plate and extending from an upper edge of said first plate, said first slot being perpendicular to said base;
   a first bar coupled to and extending perpendicularly from said first plate, said first bar being hollow;
   a sleeve positioned around said first bar;
   a second plate coupled to and extending perpendicularly from said sleeve toward a first end of said base such that said second plate is parallel to said first plate;
   a second slot positioned in said second plate and extending from a top of said second plate such that said second slot is aligned with said first slot;
   an actuator coupled to and positioned in said first bar, said actuator being operationally coupled to said sleeve, said actuator being configured for selectively motivating said second plate toward said first plate;
   wherein said actuator is positioned in said first bar such that said actuator is positioned for motivating said second plate toward said first plate for frictionally coupling to a substrate positioned between said first plate and said second plate for fixedly positioning the substrate such that said first slot and said second slot are configured for inserting a blade of a band saw for cutting the substrate;
   a second bar coupled to and extending perpendicularly from said first plate, said second bar being V-shaped when viewed longitudinally, said second bar having a lower limit positioned at a terminus of said first slot;
   an orifice positioned in said second plate and extending from said second slot; and
   wherein said second bar is positioned on said first plate such that said second bar is configured for squaring the substrate to the blade and such that the blade can pass through an upper limit of said second bar for severing the substrate wherein said orifice is positioned in said second plate such that said orifice is positioned for selectively inserting said second bar as said second plate is motivated toward said first plate.

14. The assembly of claim 13, further including a third bar coupled to and extending vertically from a second end of said base, said third bar being T-shaped, wherein said third bar is positioned on said base such that said third bar is configured for supporting the substrate positioned between said first plate and said second plate.

15. The assembly of claim 14, further including said third bar having an upper surface, said upper surface being coplanar with said upper limit of said second bar such that said second bar and said third bar are configured for supporting a linear substrate perpendicular to the blade.

16. A band saw vice assembly comprising:
   a base, said base comprising a frame, said frame being tubular and rectangularly shaped;
   a first plate coupled to and extending vertically from a first side of said base, said first plate having a first edge positioned proximate to a midpoint of said first side, said first plate having a second edge distal from a first end of said base, said second edge being tapered proximate to an upper edge of said first plate;
   a first slot positioned in said first plate and extending from said upper edge of said first plate, said first slot being perpendicular to said base, said first slot being substantially aligned with said first end of said base;
   a first bar coupled to and extending perpendicularly from said first plate past a second side of said base, said first bar being hollow, said first bar being substantially rectangularly shaped when viewed longitudinally;
   a sleeve positioned around said first bar;

a second plate coupled to and extending perpendicularly from said sleeve toward said first end of said base such that said second plate is parallel to said first plate, said sleeve being positioned on an exterior face of said second plate, said second plate having upper corners, said upper corners being arcuate;

a second slot positioned in said second plate and extending from a top of said second plate such that said second slot is aligned with said first slot, said second slot being V-shaped proximate to said top of said second plate;

an actuator coupled to and positioned in said first bar, said actuator being operationally coupled to said sleeve, said actuator being configured for selectively motivating said second plate toward said first plate, wherein said actuator is positioned in said first bar such that said actuator is positioned for motivating said second plate toward said first plate for frictionally coupling to a substrate positioned between said first plate and said second plate for fixedly positioning the substrate such that said first slot and said second slot are configured for inserting a blade of a band saw for cutting the substrate, said actuator comprising:
- a third slot positioned in said first bar, said third slot extending from proximate to a first terminus to proximate to a second terminus of said first bar,
- a third plate coupled to said sleeve and extending through said third slot into said first bar,
- a first hole positioned in said third plate, said first hole being threaded,
- a second hole positioned in said second terminus of said first bar,
- a rod positioned through said second hole and rotationally coupled to said second terminus of said first bar, said rod being threaded, said rod being threadedly inserted through said first hole such that said rod is threadedly coupled to said third plate, and
- a coupler coupled to said rod and positioned externally to said first bar, said coupler being configured for coupling to a tool for providing mechanical advantage in rotating said rod within said first hole, wherein said coupler is positioned on said rod such that said coupler is configured for coupling to the tool positioning a user for selectively rotating said rod for motivating said second plate toward said first plate for frictionally coupling to the substrate positioned between said first plate and said second plate for fixedly positioning the substrate such that said first slot and said second slot are configured for inserting the blade of the band saw for cutting the substrate, said coupler comprising a nut;

a second bar coupled to and extending perpendicularly from said first plate, said second bar being V-shaped when viewed longitudinally, said second bar having a lower limit positioned at a terminus of said first slot, wherein said second bar is positioned on said first plate such that said second bar is configured for squaring the substrate to the blade and such that the blade can pass through an upper limit of said second bar for severing the substrate;

an orifice positioned in said second plate and extending from said second slot, wherein said orifice is positioned in said second plate such that said orifice is positioned for selectively inserting said second bar as said second plate is motivated toward said first plate;

a third bar coupled to and extending vertically from a second end of said base, said third bar being T-shaped, wherein said third bar is positioned on said base such that said third bar is configured for supporting the substrate positioned between said first plate and said second plate, said third bar having an upper surface, said upper surface being coplanar with said upper limit of said second bar such that said second bar and said third bar are configured for supporting a linear substrate perpendicular to the blade;

a block coupled to said sleeve and said second plate, wherein said block is positioned on said sleeve and said second plate such that said block is positioned for stabilizing said second plate in parallel with said first plate; and wherein said coupler is positioned on said rod such that said coupler is configured for coupling to the tool positioning the user for selectively rotating said rod for motivating said second plate toward said first plate for frictionally coupling to the substrate positioned between said first plate and said second plate for fixedly positioning the substrate such that said first slot and said second slot are configured for inserting the blade of the band saw for cutting the substrate, wherein said second bar is positioned on said first plate such that said second bar is configured for squaring the substrate to the blade and such that the blade can pass through said upper limit of said second bar for severing the substrate wherein said orifice is positioned in said second plate such that said orifice is positioned for selectively inserting said second bar as said second plate is motivated toward said first plate.

* * * * *